(12) United States Patent
Litsyn et al.

(10) Patent No.: US 7,681,109 B2
(45) Date of Patent: Mar. 16, 2010

(54) METHOD OF ERROR CORRECTION IN MBC FLASH MEMORY

(75) Inventors: Simon Litsyn, Giv'at Shmuel (IL); Idan Alrod, Tel Aviv (IL); Eran Sharon, Rishoin Lezion (IL); Mark Murin, Kfar Saba (IL); Menahem Lasser, Kohav Yair (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 682 days.

(21) Appl. No.: 11/329,075

(22) Filed: Jan. 11, 2006

(65) Prior Publication Data

US 2007/0089034 A1    Apr. 19, 2007

Related U.S. Application Data

(60) Provisional application No. 60/725,862, filed on Oct. 13, 2005.

(51) Int. Cl.
*G11C 29/00*    (2006.01)

(52) U.S. Cl. ...................... 714/773; 714/767

(58) Field of Classification Search ................ 714/773, 714/767
See application file for complete search history.

(56) References Cited

U.S. PATENT DOCUMENTS

| | | | | |
|---|---|---|---|---|
| 4,802,170 A * | 1/1989 | Trottier | ...................... | 714/702 |
| 5,022,031 A * | 6/1991 | Baggen | ...................... | 714/793 |
| 5,404,485 A | 4/1995 | Ban | | |
| 5,434,825 A | 7/1995 | Harari | | |
| 5,438,573 A * | 8/1995 | Mangan et al. | ............... | 714/711 |
| 5,459,850 A * | 10/1995 | Clay et al. | ................... | 711/171 |
| 5,603,001 A * | 2/1997 | Sukegawa et al. | ........... | 711/103 |
| 5,873,112 A * | 2/1999 | Norman | ...................... | 711/103 |
| 5,903,495 A * | 5/1999 | Takeuchi et al. | ........ | 365/185.03 |
| 6,041,001 A * | 3/2000 | Estakhri | ..................... | 365/200 |
| 6,046,935 A * | 4/2000 | Takeuchi et al. | ........ | 365/185.03 |
| 6,064,591 A * | 5/2000 | Takeuchi et al. | ........ | 365/185.03 |
| 6,145,069 A * | 11/2000 | Dye | ........................... | 711/170 |
| 6,519,186 B2 * | 2/2003 | Tamada et al. | ......... | 365/185.33 |
| 6,522,580 B2 | 2/2003 | Chen et al. | | |
| 6,523,132 B1 * | 2/2003 | Harari et al. | .................... | 714/8 |
| 6,549,459 B2 * | 4/2003 | Higuchi | ................. | 365/185.09 |

(Continued)

OTHER PUBLICATIONS

U.S. Appl. No. 11/035,807, filed Sep. 2005, Lasser.

(Continued)

*Primary Examiner*—Joseph D Torres
(74) *Attorney, Agent, or Firm*—Mark M. Friedman

(57) ABSTRACT

A plurality of logical pages is stored in a MBC flash memory along with corresponding ECC bits, with at least one of the MBC cells storing bits from more than one logical page, and with at least one of the ECC bits applying to two or more of the logical pages. When the pages are read from the memory, the data bits as read are corrected using the ECC bits as read. Alternatively, a joint, systematic or non-systematic ECC codeword is computed for two or more of the logical pages and is stored instead of those logical pages. When the joint codeword is read, the logical bits are recovered from the codeword as read. The scope of the invention also includes corresponding memory devices, the controllers of such memory devices, and also computer-readable storage media bearing computer-readable code for implementing the methods.

6 Claims, 6 Drawing Sheets

U.S. PATENT DOCUMENTS

| | | | |
|---|---|---|---|
| 6,625,061 B2 * | 9/2003 | Higuchi | 365/185.09 |
| 6,643,188 B2 | 11/2003 | Tanaka et al. | |
| 6,684,345 B2 * | 1/2004 | Harari et al. | 714/8 |
| 6,725,342 B1 * | 4/2004 | Coulson | 711/141 |
| 6,732,322 B1 * | 5/2004 | Miyauchi et al. | 714/784 |
| 6,785,767 B2 * | 8/2004 | Coulson | 711/112 |
| 6,791,880 B1 * | 9/2004 | Kurihara et al. | 365/185.21 |
| 6,845,438 B1 * | 1/2005 | Tanaka et al. | 711/206 |
| 6,990,623 B2 * | 1/2006 | Furukawa | 714/773 |
| 7,054,991 B2 * | 5/2006 | Tanaka et al. | 711/103 |
| 7,096,406 B2 * | 8/2006 | Kanazawa et al. | 714/763 |
| 7,171,594 B2 * | 1/2007 | Wyatt et al. | 714/704 |
| 7,219,271 B2 * | 5/2007 | Kleveland et al. | 714/718 |
| 7,277,336 B2 * | 10/2007 | Ilkbahar et al. | 365/200 |
| 7,308,637 B2 * | 12/2007 | Nakagawa et al. | 714/758 |
| 7,322,002 B2 * | 1/2008 | Keays et al. | 714/763 |

OTHER PUBLICATIONS

U.S. Appl. No. 11/061,634, filed Sep. 2005, Lasser.
U.S. Appl. No. 11/078,478, filed May 2006, Murin.
U.S. Appl. No. 10/867,645, filed Jan. 2005, Ban, et al.

* cited by examiner

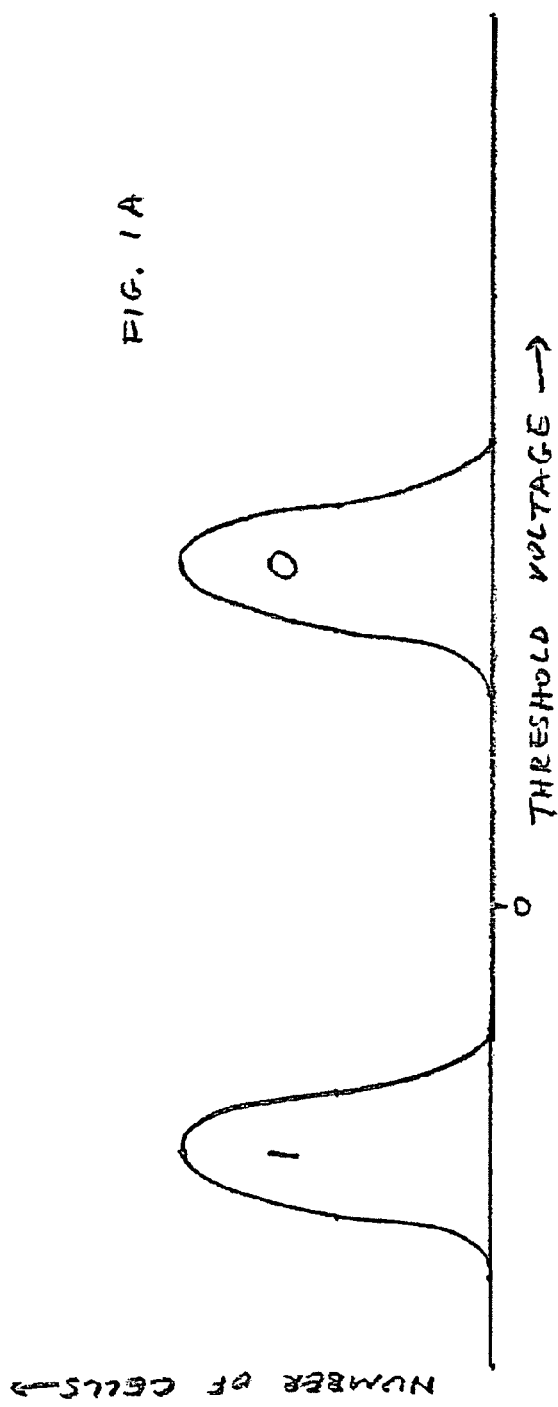
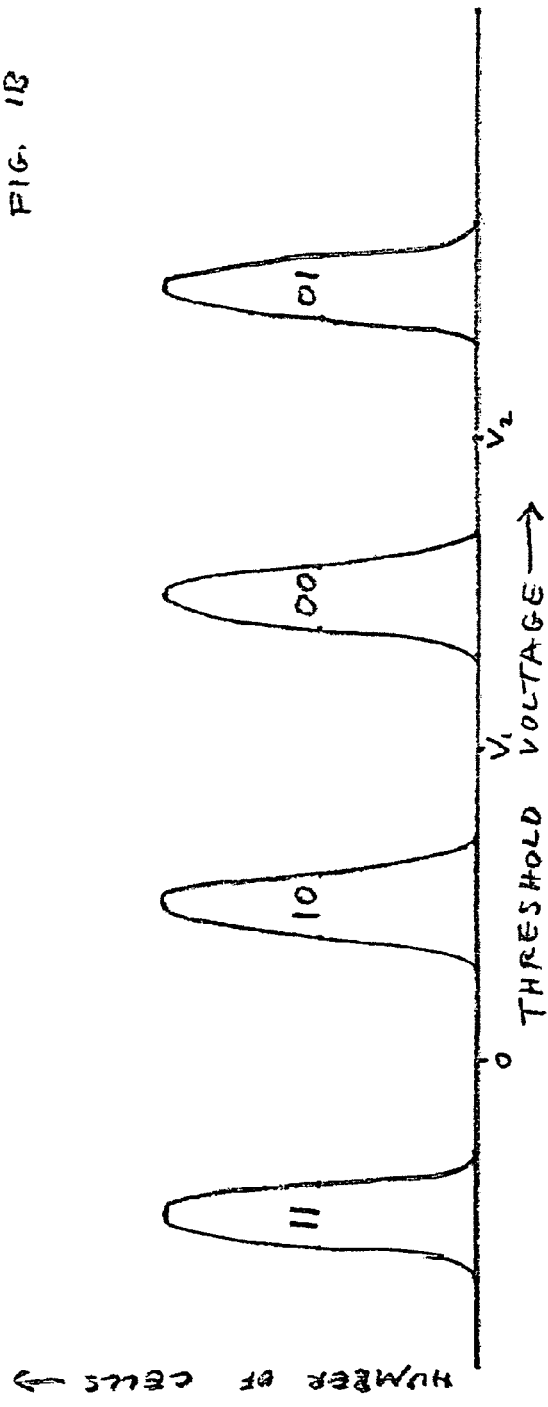

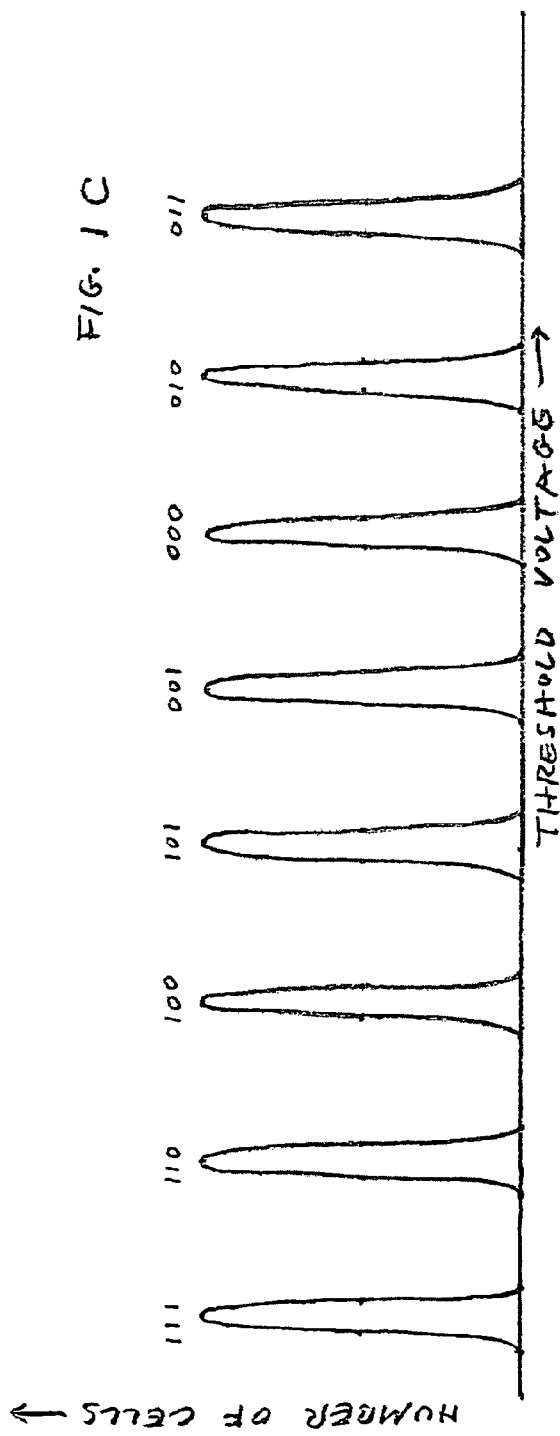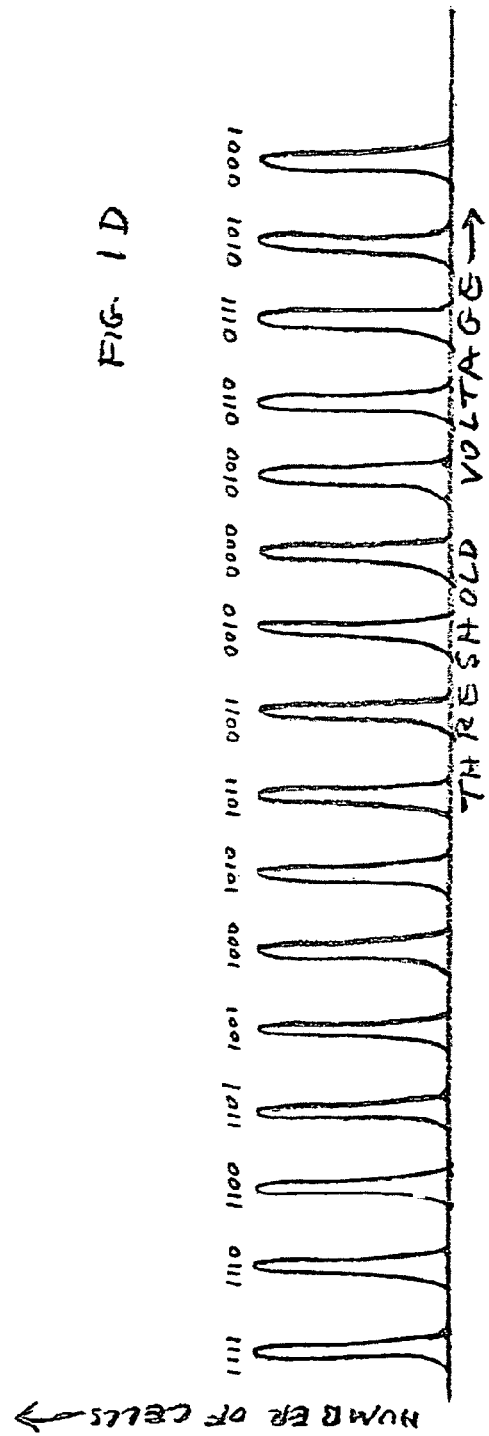

| 4 | 4 | 4 | 4 | 4 | 4 | 4 | 4 | 4 | 4 | 4 | 4 |
|---|---|---|---|---|---|---|---|---|---|---|---|
| 3 | 3 | 3 | 3 | 3 | 3 | 3 | 3 | 3 | 3 | 3 | 3 |
| 2 | 2 | 2 | 2 | 2 | 2 | 2 | 2 | 2 | 2 | 2 | 2 |
| 1 | 1 | 1 | 1 | 1 | 1 | 1 | 1 | 1 | 1 | 1 | 1 |

FIGURE 3B

| 3&4 | 3&4 | 3&4 | 3&4 | 3&4 | 3&4 | 3&4 | 3&4 | 3&4 | 3&4 | 3&4 | 3&4 |
|-----|-----|-----|-----|-----|-----|-----|-----|-----|-----|-----|-----|
| 3&4 | 3&4 | 3&4 | 3&4 | 3&4 | 3&4 | 3&4 | 3&4 | 3&4 | 3&4 | 3&4 | 3&4 |
| 1&2 | 1&2 | 1&2 | 1&2 | 1&2 | 1&2 | 1&2 | 1&2 | 1&2 | 1&2 | 1&2 | 1&2 |
| 1&2 | 1&2 | 1&2 | 1&2 | 1&2 | 1&2 | 1&2 | 1&2 | 1&2 | 1&2 | 1&2 | 1&2 |

METHOD OF ERROR CORRECTION IN MBC FLASH MEMORY

This patent application claims the benefit of U.S. Provisional Patent Application No. 60/725,862, filed Oct. 13, 2005

FIELD AND BACKGROUND OF THE INVENTION

The present invention relates to error correction of digital data and, more particularly, to a method of error correction for flash memory devices that store multiple bits per cell.

Flash memory devices have been known for many years. Typically, each cell within a flash memory stores one bit of information. Traditionally, the way to store a bit has been by supporting two states of the cell—one state represents a logical "0" and the other state represents a logical "1". In a flash memory cell the two states are implemented by having a floating gate above the cell's channel (the area connecting the source and drain elements of the cell's transistor), and having two valid states for the amount of charge stored within this floating gate. Typically, one state is with zero charge in the floating gate and is the initial unwritten state of the cell after being erased (commonly defined to represent the "1" state) and another state is with some amount of negative charge in the floating gate (commonly defined to represent the "0" state). Having negative charge in the gate causes the threshold voltage of the cell's transistor (i.e. the voltage that has to be applied to the transistor's control gate in order to cause the transistor to conduct) to increase. Now it is possible to read the stored bit by checking the threshold voltage of the cell: if the threshold voltage is in the higher state then the bit value is "0" and if the threshold voltage is in the lower state then the bit value is "1". Actually there is no need to accurately read the cell's threshold voltage. All that is needed is to correctly identify in which of the two states the cell is currently located. For that purpose it is enough to make a comparison against a reference voltage value that is in the middle between the two states, and thus to determine if the cell's threshold voltage is below or above this reference value.

FIG. 1A shows graphically how this works. Specifically, FIG. 1A shows the distribution of the threshold voltages of a large population of cells. Because the cells in a flash memory are not exactly identical in their characteristics and behavior (due, for example, to small variations in impurities concentrations or to defects in the silicon structure), applying the same programming operation to all the cells does not cause all of the cells to have exactly the same threshold voltage. (Note that, for historical reasons, writing data to a flash memory is commonly referred to as "programming" the flash memory.) Instead, the threshold voltage is distributed similar to the way shown in FIG. 1A. Cells storing a value of "1" typically have a negative threshold voltage, such that most of the cells have a threshold voltage close to the value shown by the left peak of FIG. 1A, with some smaller numbers of cells having lower or higher threshold voltages. Similarly, cells storing a value of "0" typically have a positive threshold voltage, such that most of the cells have a threshold voltage close to the value shown by the right peak of FIG. 1A, with some smaller numbers of cells having lower or higher threshold voltages.

In recent years a new kind of flash memory has appeared on the market, using a technique conventionally called "Multi Level Cells" or MLC for short. (This nomenclature is misleading, because the previous type of flash cells also have more than one level: they have two levels, as described above. Therefore, the two kinds of flash cells are referred to herein as "Single Bit Cells" (SBC) and "Multi-Bit Cells" (MBC).) The improvement brought by the MBC flash is the storing of two or more bits in each cell. In order for a single cell to store two bits of information the cell must be able to be in one of four different states. As the cell's "state" is represented by its threshold voltage, it is clear that a 2-bit MBC cell should support four different valid ranges for its threshold voltage. FIG. 1B shows the threshold voltage distribution for a typical 2-bit MBC cell. As expected, FIG. 1B has four peaks, each corresponding to one state. As for the SBC case, each state is actually a range and not a single number. When reading the cell's contents, all that must be guaranteed is that the range that the cell's threshold voltage is in is correctly identified. For a prior art example of an MBC flash memory see U.S. Pat. No. 5,434,825 to Harari.

Similarly, in order for a single cell to store three bits of information the cell must be able to be in one of eight different states. So a 3-bit MBC cell should support eight different valid ranges for its threshold voltage. FIG. 1C shows the threshold voltage distribution for a typical 3-bit MBC cell. As expected, FIG. 1C has eight peaks, each corresponding to one state. FIG. 1D shows the threshold voltage distribution for a 4-bit MBC cell, for which sixteen states, represented by sixteen threshold voltage ranges, are required.

When encoding two bits in an MBC cell via the four states, it is common to have the left-most state in FIG. 1B (typically having a negative threshold voltage) represent the case of both bits having a value of "1". (In the discussion below the following notation is used-the two bits of a cell are called the "lower bit" and the "upper bit". An explicit value of the bits is written in the form ["upper bit" "lower bit"], with the lower bit value on the right. So the case of the lower bit being "0" and the upper bit being "1" is written as "10". One must understand that the selection of this terminology and notation is arbitrary, and other names and encodings are possible). Using this notation, the left-most state represents the case of "11". The other three states are typically assigned by the following order from left to right: "10", "00", "01". One can see an example of an implementation of an MBC NAND flash memory using this encoding in U.S. Pat. No. 6,522,580 to Chen, which patent is incorporated by reference for all purposes as if fully set forth herein. See in particular FIG. 8 of the Chen patent. U.S. Pat. No. 6,643,188 to Tanaka also shows a similar implementation of an MBC NAND flash memory, but see FIG. 7 there for a different assignment of the states to bit encodings: "11", "10", "01", "00". The Chen encoding is the one illustrated in FIG. 1B.

We extend the above terminology and notation to the cases of more than two bits per cell, as follows. The left-most unwritten state represents "all ones" ("1 . . . 1"), the string "1 . . . 10" represents the case of only the lowest bit of the cell being written to "0", and the string "01 . . . 1" represents the case of only the most upper bit of the cell being written to "0".

When reading an MBC cell's content, the range that the cell's threshold voltage is in must be identified correctly; only in this case this cannot always be achieved by comparing to only one reference voltage. Instead, several comparisons may be necessary. For example, in the case illustrated in FIG. 1B, to read the lower bit, the cell's threshold voltage first is compared to a reference comparison voltage $V_1$ and then, depending on the outcome of the comparison, to either a zero reference comparison voltage or a reference comparison voltage $V_2$. Alternatively, the lower bit is read by unconditionally comparing the threshold voltage to both a zero reference voltage and a reference comparison voltage $V_2$, again requiring two comparisons. For more than two bits per cell, even more comparisons might be required.

The bits of a single MBC cell may all belong to the same flash page, or they may be assigned to different pages so that, for example in a 4-bit cell, the lowest bit is in page 0, the next bit is in page 1, the next bit in page 2, and the highest bit is in page 3. (A page is the smallest portion of data that can be separately written in a flash memory). Although both methods are in use, the present invention is intended primarily for the "each bit in its own page" approach.

Lasser, U.S. patent application Ser. No. 11/035,807, deals with methods of encoding bits in flash memory cells storing multiple bits per cell. Lasser, U.S. patent application Ser. No. 11/061,634, and Murin, U.S. patent application Ser. No. 11/078,478, deal with the implications of those methods of bits encoding on the question of error distribution across different logical pages of multi-bit flash cells. Specifically, Lasser '634 teaches a method for achieving even distribution of errors across different logical pages, as seen by the user of the data and as dealt with by the Error Correction Code (ECC) circuitry, using a logical-to-physical mapping of bit encodings; and Murin teaches a method for achieving even distribution of errors across different logical pages, as seen by the user of the data and as dealt with by the ECC circuitry, using interleaving of logical pages between physical bit pages. All three of these prior art patent applications are incorporated by reference for all purposes as if fully set forth herein.

Both Lasser '634 and Murin address the same goal: reducing the error rate for which the ECC circuitry should be designed. In the example presented in both applications a group of 15,000 4-bit MBC flash memory cells is used for storing 4 logical pages of data, of 15,000 bits each. The assumed cell error rate is 1 in 1,000. The resulting optimal number of bit errors is 15, and therefore the optimal average bit errors in a logical page is 3.75. The example shows that unless the proposed innovations are used, a specific logical page might end up with a much higher bit error rate—6 bit errors in the example shown. This means that even though the overall average of bit errors across all bits stored in the cells is relatively low (15 in 60,000, or 1 in 4,000), unless special measures are taken the ECC circuitry dealing with correcting errors in a logical page must be designed to handle a relatively high average bit error rate (in that example—6 in 15,000, or 1 in 2,500).

There is thus a widely recognized need for, and it would be highly advantageous to have, a method of error correction for MBC flash memories that would overcome the disadvantages of presently known methods as described above.

Definitions

A "logical page" is the smallest chunk of data provided from the outside to the storage system to be stored by a single command. For example, in two-bits-per-cell MBC NAND flash devices in which the multiple bits of the same cell belong to different pages, the writing of a group of cells is done by first sending a first "page write" command for the first bit of the cells in the group, and then sending a second "page write" command for the second bit of the cells in the group. The data bits provided with the first command constitute a first logical page, and the data bits provided with the second command constitute a second logical page.

As in Murin, a "bit page" is the collection of all bits occupying the same bit position in their group of cells, where that collection is written together in one command. For example, if the number of bits in a logical page is the same as the number of cells in a physical page then the collection of all the highest (or lowest) order bits of all the cells in a physical page constitutes one bit page. In the previous example, all bits stored as the first bits in their cells constitute a single bit page. In most systems there is a one-to-one correspondence between a logical page and a bit page into which the logical page is stored. But one can see in Murin that such correspondence is not mandatory: in Murin's method a logical page is interleaved across multiple bit pages.

SUMMARY OF THE INVENTION

The present invention uses a different approach to the same problem of minimizing the bit error rate for which the ECC circuitry must be designed. Both Lasser '634 and Murin share the same basic approach to solving the problem-both rely on ECC circuitry that operates on a single logical page at a time. In the terms of the above example, the ECC corrects chunks of data that are 15,000 bits each. Each such chunk of data is accompanied by its own ECC parity bits. The union of the data bits and their associated ECC parity bits is called a "codeword" in the terminology of ECC technology. The ratio of number of data bits to the total number of bits in the codeword is called the "rate" of the ECC scheme. The higher the rate the better, as less storage bits are "wasted" for protecting the data bits. Obviously, the higher the expected bit error rate in the data, the more bits should be allocated to ECC parity bits and the lower the ECC rate.

The innovation of the present invention is in having the ECC circuitry operate not on a single logical page at a time, but on all the bits stored in the cells, or at least on the bits of more than one logical page, as one big chunk. In the terms of the above example, the ECC corrects chunks of data that are 60,000 bits each. These 60,000 data bits are accompanied by corresponding ECC parity bits that allow the correction of the bigger chunk of data to take place.

The expected bit error rate in the larger chunk of data bits containing the data bits of all logical pages sharing the same cells in the above example is 15 in 60,000 or 1 in 4,000. This is equal to the optimal average achieved by the methods of Lasser '634 and Murin, but without the extra complexity of code mapping or interleaving. It is easy to see this is not a coincidence but a general property of the method—regardless of page size or error distribution profile, when using an ECC scheme that operates on all bits in the cells as one chunk, treating all of them as one codeword, the expected average bit error rate always is the optimal value achieved by Lasser '634 and Murin.

It is true that an ECC scheme operating on a larger codeword requires more complex circuitry. But this is compensated by the well-known result of error correction theory, according to which the larger the codeword operated on, the higher the code rate that can be achieved, for the same bit error rate. In other words, by using a longer ECC codeword the number of ECC parity bits that have to be stored in the flash memory and therefore the amount of storage space "wasted" for error correction is made smaller. This usually more than compensates for the extra ECC circuitry.

One might argue that if each one of the logical pages is handled on its own by a different ECC scheme using a different code rate, then the overall number of parity bits for all logical pages may be made smaller than the number of parity bits when using the large codeword of the present invention. This is so because some of the logical pages are known to have low error rates and therefore need only small numbers of parity bits. However, that argument ignores the need to implement multiple ECC modules, one per logical page, which may be costly. Alternatively, one ECC module is used for all logical pages, correcting them one at a time, but then the implemented module must be one capable of correcting the logical page with the highest error rate and using a low code rate, and we are again better off with the method of the present invention.

Therefore, according to the present invention there is provided a method of storing data in a Multi-Bit per Cell flash memory, including the steps of: (a) calculating error correction parity bits for a plurality of logical pages of data bits; wherein at least one of the error correction parity bits applies jointly to at least two of the logical pages; and (b) programming the MBC flash memory with the data bits and the error correction parity bits, with at least one cell of the MBC flash memory being programmed with data bits from more than one of the at least two logical pages to which the at least one joint error correction parity bit applies.

Furthermore, given a MBC flash memory programmed with data bits of a plurality of logical pages and with error correction parity bits calculated for the data bits, with at least one of the error correction parity bits applying jointly to at least two of the logical pages, and with at least one cell of the MBC flash memory being programmed with data bits from more than one of the at least two logical pages to which the at least one joint error correction bit applies: according to the present invention there is provided a method of recovering the data bits, including the steps of: (a) reading, from the MBC flash memory: (i) the data bits of the at least two logical pages to which the at least one joint error correction parity bit applies, and (ii) the error correction parity bits that apply to any of the at least two logical pages to which the at least one joint error correction parity bit applies; and (b) correcting the data bits, as read from the MBC flash memory, in accordance with the error correction parity bits, as read from the MBC flash memory.

Furthermore, according to the present invention, there is provided a controller, for a MBC flash memory, that is operative to store, in the MBC flash memory, data bits of a plurality of logical pages by steps including calculating error correction parity bits for the data bits, with at least one error correction parity bit applying jointly to at least two of the logical pages, and with data bits from more than one of the at least two logical pages, to which the at least one joint error correction parity bit applies, being stored together in each of at least one cell of the MBC flash memory.

Furthermore, according to the present invention there is provided a computer-readable storage medium having computer-readable code embodied on the computer-readable storage medium, the computer-readable code for managing a MBC flash memory, the computer-readable code including: (a) program code for calculating error correction parity bits for a plurality of logical pages of data bits to be stored in the MBC flash memory, wherein at least one of the error correction parity bits applies jointly to at least two of the logical pages; and (b) program code for programming the MBC flash memory with the data bits and the error correction parity bits, with at least one cell of the MBC flash memory being programmed with data bits from more than one of the at least two logical pages to which the at least one joint error correction parity bit applies.

Furthermore, given a Multi-Bit per Cell (MBC) flash memory programmed with data bits of a plurality of logical pages and with error correction parity bits calculated for said data bits, with at least one of the error correction parity bits applying jointly to at least two of the logical pages, and with at least one cell of the MBC flash memory being programmed with data bits from more than one of the at least two logical pages to which the at least one joint error correction bit applies: according to the present invention there is provided a computer-readable storage medium having computer-readable code embodied on the computer-readable storage medium, the computer-readable code including: (a) program code for reading, from the MBC flash memory: (i) the data bits of the at least two logical pages to which the at least one joint error correction parity bit applies, and (ii) the error correction parity bits that apply to any of the at least two logical pages to which the at least one joint error correction parity bit applies; and (b) program code for correcting the data bits, as read from the MBC flash memory, in accordance with the error correction parity bits, as read from the MBC flash memory.

Furthermore, according to the present invention there is provided a method of storing data in a MBC flash memory, including the steps of: (a) computing a joint ECC codeword for at least two of a plurality of logical pages of data bits; and (b) programming the MBC flash memory with the joint ECC codeword.

Furthermore, given a MBC flash memory programmed with a joint ECC codeword computed for at least two of a plurality of logical pages of data bits: according to the present invention there is provided a method of recovering the data bits, including the steps of: (a) reading the joint ECC codeword from the flash memory; and (b) recovering, from the joint ECC codeword as read from the flash memory, the data bits of the at least two logical pages from which the joint ECC codeword was computed.

Furthermore, according to the present invention there is provided a controller, for a MBC flash memory, that is operative to store, in the MBC flash memory, data bits of a plurality of logical pages, by steps including computing a joint ECC codeword for at least two of the logical pages.

Furthermore, according to the present invention there is provided a computer-readable storage medium having computer-readable code embodied on the computer-readable storage medium, the computer-readable code for managing a MBC flash memory, the computer-readable code including: (a) program code for computing a joint ECC codeword for at least two of a plurality of logical pages of data bits to be stored in the MBC flash memory; and (b) program code for programming the MBC flash memory with the joint ECC codeword.

Furthermore, given a MBC flash memory programmed with a joint ECC codeword computed for at least two of a plurality of logical pages of data bits: according to the present invention there is provided a computer-readable storage medium having computer-readable code embodied on the computer-readable storage medium, the computer-readable code including: (a) program code for reading the joint ECC codeword from the flash memory; and (b) program code for recovering, from the joint ECC codeword as read from the flash memory, the data bits of the at least two logical pages from which the joint ECC codeword was computed.

According to a first basic method of the present invention, when a plurality of logical pages of data bits are stored in a MBC flash memory, error correction parity bits are calculated for the data bits, such that at least one of the error correction parity bits applies to at least two of the logical pages. That an error correction parity bit "applies to" a logical page means that the error correction parity bit is computed from the data of that logical page and must be used in the correction of the data of that logical page. In the appended claims, such error correction parity bits that apply to two or more logical pages are called "joint" error correction parity bits. Then the MBC flash memory is programmed with the data bits and with the error correction parity bits, with at least one cell of the MBC flash memory being programmed with data bits from more than one of the logical pages to which the joint error correction parity bit(s) apply/applies. In other words, not all the cells of the MBC flash memory, that are programmed with data bits, are programmed with data bits from only one logical page.

Preferably, all the error correction parity bits apply to all the logical pages. Alternatively, if there are three or more logical pages, error correction bits are calculated jointly for at least two of the logical pages but not for all of the logical pages. Also alternatively, only some error correction parity bits apply to multiple logical pages, while other error correction parity bits apply only to a single logical page.

Preferably, each cell of the flash memory, that is programmed with the data bits and the error correction parity bits, bits, is programmed with as many of the bits as there are logical pages in the plurality of logical pages. Also preferably, the programming is followed by reading, from the flash memory, the data bits of the two or more logical pages to which the error correction parity bit(s) apply/applies, along with both the joint error correction parity bits and the other error correction parity bits, if any, that apply to those two or more logical pages. Usually, all the error correction bits apply to those two or more logical pages, but it is possible that some or even most of the error correction parity bits apply to only some of those logical pages (when there are three or more such logical pages) or even to only one of those logical pages. Then the data bits, as read from the flash memory, are corrected in accordance with the error correction parity bits, as read from the flash memory.

According to a second basic method of the present invention, when a plurality of logical pages of data bits are stored in a MBC flash memory, a joint ECC codeword is computed for at least two of the logical pages, The ECC may be either systematic or non-systematic. Then, the MBC flash memory is programmed with the joint ECC codeword.

In some embodiments of the method, the plurality of logical pages includes three or more logical pages and the codeword is computed for fewer than all the logical pages.

Preferably, each cell of the flash memory, that is programmed with bits of the joint ECC codeword, is programmed with as many bits of the joint ECC codeword as there are logical pages for which the joint ECC codeword was computed. Alternatively, each cell of the flash memory, that is programmed with bits of the joint ECC codeword, is programmed with the same number of bits of the joint ECC codeword as there are logical pages in the plurality of logical pages.

Preferably, the programming is followed by reading the joint ECC codeword from the flash memory and then recovering, from the joint ECC codeword as read from the flash memory, the data bits of the logical pages from which the joint ECC codeword was computed.

The scope of the present invention also includes a controller that manages a MBC memory according to one of the methods of the present invention, a memory device that includes the controller and the MBC memory, and a computer-readable storage medium having embodied thereon computer-readable code for managing a memory according to one of the methods of the present invention. Preferably, the controller is operative to provide the data bits that are stored in the MBC memory to a host of the memory device, in accordance with the method of the present invention that is implemented by the controller.

BRIEF DESCRIPTION OF THE DRAWINGS

The invention is herein described, by way of example only, with reference to the accompanying drawings, wherein:

FIGS. 1A-1D show threshold voltage distributions in a one-bit flash cell, a two-bit flash cell, a three-bit flash cell and a four-bit flash cell;

FIGS. 2A and 2B illustrate systematic ECC codewords that span two logical pages each;

FIGS. 3A and 3B illustrate non-systematic ECC codewords that span two logical pages each;

DESCRIPTION OF THE PREFERRED EMBODIMENTS

Figure 4:
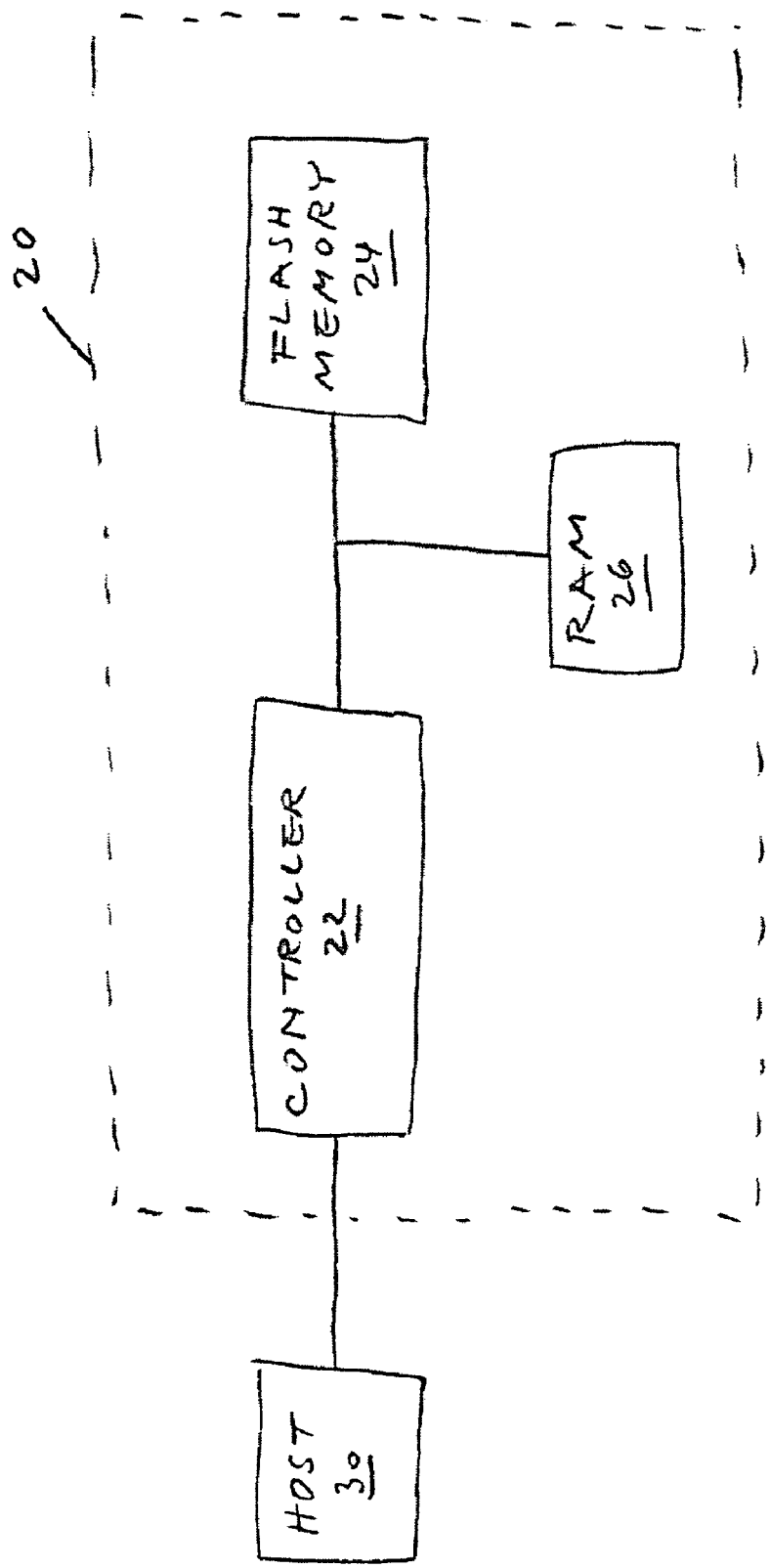
FIG. 4 is a high-level block diagram of a flash memory device of the present invention.

The present invention is of a method of error correction in a Multi-Bit-per-Cell memory.

The principles and operation of MBC error correction according to the present invention may be better understood with reference to the drawings and the accompanying description.

In all prior art methods (such as the methods of Lasser'634 and Murin) the data to be stored in a group of MBC cells is provided to the storage system from the outside as multiple logical pages, and ECC parity bits are then separately calculated for each logical page. Furthermore, in most such systems all the data bits of a logical page and the corresponding parity bits of that same page are stored in the same bit page. The method of Murin is an exception to this second observation, as the interleaving scheme results in the bits of a logical page being scattered in multiple bit pages. But even Murin obeys the first observation of the parity bits of a logical page depending only on the data bits of that logical page. With the method of the present invention, this is no longer the case. Some or all parity bits are a function of data bits from multiple logical pages, not only from a single one. This is the result of treating all bits as one long codeword.

A consequence of this characteristic of the writing process (i.e. that some or all parity bits are a function of data bits from multiple logical pages) is the way parity bits are used in the reading and error correction process. In all prior art systems (including Lasser '634 and Murin) a specific parity bit is only used to correct a single logical page. This is reasonable to expect—as each parity bit was originally calculated using only the data bits of a single logical page, that parity bit does not represent any information about data bits in other logical pages and therefore should only be used for correcting the single logical page based on which it was calculated. This is not the case in the method of the present invention—some parity bits are calculated based on data from multiple logical pages and consequently those bits may be directly used in effecting the correction of those multiple logical pages.

Ban et al., U.S. patent application Ser. No. 10/867,645, deals with a related issue. According to the method of Ban et al. each logical page has its own ECC parity bits, calculated based only on the data bits of the corresponding logical page, as in all other prior art. However, Ban et al. differs from the other prior art by allowing the corrected logical pages of the same group of cells to affect each other in a limited way. If an error is detected and corrected in a bit of a certain bit page, then some corrections may be applied to the corresponding bits of the more significant bit pages of the same cell. However, this falls short of disclosing the method of the present invention. In the method of Ban et al. there is no direct affect of a parity bit on the ECC computations of multiple logical pages, the only limited affect on another logical page being indirect through high level physical considerations that are outside the scope of the ECC calculations.

Another implication of the method of the present invention is that the bits stored in the group of cells, including both data bits and parity bits, all are handled as one long codeword of the employed ECC scheme. It does not matter what specific ECC scheme is used; what matters is that all logical pages residing in the same group of cells are handled together as one entity, from the ECC point of view. As explained above, in addition to providing optimal bit error rate, this approach also provides more efficient error correction with reduced ratio of parity bits to data bits.

The scope of the method of the present invention also includes the more generalized case in which only subsets of the logical pages residing in the same group of cells are handled as joint codewords. For example, in a four-bit-per-cell MBC flash memory one may group the logical pages as two groups of two logical pages each, or one group of three logical pages plus one single logical page, or even one group of two logical pages plus two single logical pages. The method of the present invention should be understood to include any case in which at least two logical pages sharing the same cells are handled together by the ECC scheme as a single codeword, regardless of how the other logical pages sharing the same cells are handled.

Figures 2A, 2B:
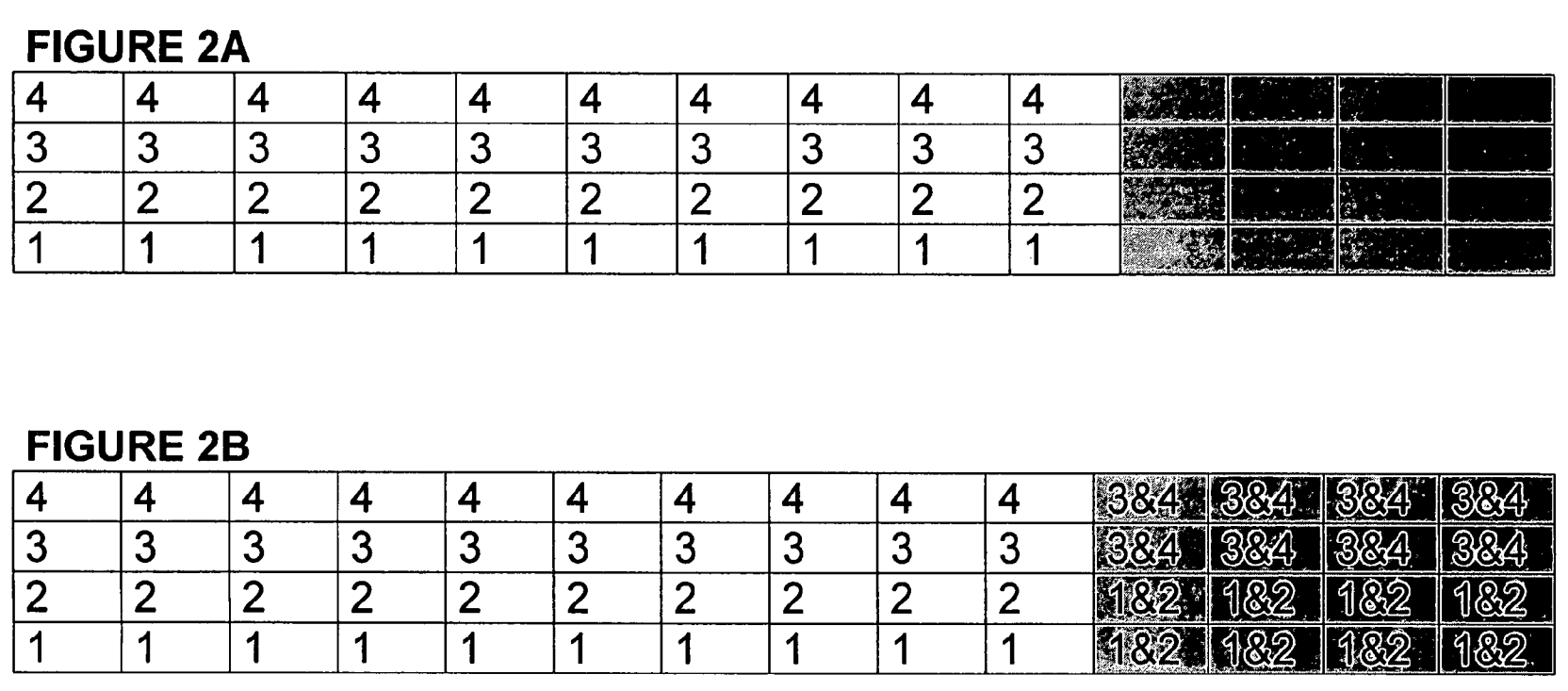

Returning now to the drawings, FIGS. 2A and 2B show, as tables, a (very small, for illustrative purposes) block of a MBC flash memory before and after the application of the method of the present invention. In each of FIGS. 2A and 2B, each column of the table represents one cell of the block, and each row represents a significance of the bit encoding: the top row represents the most significant bit, the second row represents the next-to-most significant bit, the third row represents the next-to-least significant bit and the last row represents the least significant bit. Each entry of each table shows the source logical page(s) of the bit(s) that is/are represented by the bit of the corresponding significance in the corresponding memory cell. Memory cells that store data bits are unshaded. Memory cells that store ECC bits are shaded.

Initially, four logical pages of data, with ten bits each, are stored in the memory block. The bits of the first logical page are encoded as the least significant bits of the data cells. The bits of the second logical page are encoded as the next-to-least significant bits of the data cells. The bits of the third logical page are encoded as the next-to-most significant bits of the data cells. The bits of the fourth logical page are encoded as the most significant bits of the data cells. For example, if the first bit of the first logical page is "1", if the first bit of the second logical page is "0", if the first bit of the third logical page is "0" and if the first bit of the fourth logical page is "1" then, using the bit encoding scheme illustrated in FIG. 1D, the first (leftmost) cell is programmed to the fifth voltage band from the left. At this point, the ECC cells still are unprogrammed.

Then the method of the present invention is used to turn the data bits into two 28-bit codewords, one codeword for the first and second logical pages and another codeword for the third and fourth logical pages. As shown in FIG. 2B, the ECC bits of the first codeword are encoded in the least significant bits and in the next-to-least significant bits of the ECC cells, and the ECC bits of the second codeword are encoded in the next-to-most significant bits and in the most significant bits of the ECC cells.

So far the invention has been presented in the context of error correction schemes that are "systematic". Systematic error correction coding is characterized by the fact that the original data bits are preserved by the encoding process and can be identified within the bits stored. In other words, the error correction mechanism takes the original data bits, adds to them some parity bits, and stores both data bits and parity bits. Later, when reading the stored bits, both the data bits and the parity bits are read, and the parity bits enable the correction of errors in the read data bits, thus generating the original data bits.

However, the present invention is equally applicable to non-systematic error correction codes. In such codes the original data bits are not preserved and are not stored. Instead, the encoding process transforms the original data bits into a larger group of bits (herein called "protected data bits") that are the ones stored. Like the union of data bits and the associated ECC parity bits of a systematic error code, the protected data bits of a non-systematic error code are considered herein to be the codeword corresponding to the original data bits. When reading the stored protected data bits the original data bits are re-generated, even if there are errors in the protected data bits. The defining characteristic of non-systematic codes is that there is no direct correspondence between a specific original data bit and a specific stored bit. An original data bit is "scattered" in multiple stored bits, and only the combination of those multiple stored bits tells the value of the original bit.

FIGS. 3A and 3B correspond to FIGS. 2A and 2B, but using non-systematic ECC instead of systematic ECC. FIG. 3A is identical to FIG. 2A. FIG. 3B shows that, following non-systematic ECC encoding of the present invention, no meaningful distinction can be made between data bits and ECC bits. All the bits of the first codeword are encoded in the least significant bits and in the next-to-least significant bits of both the data cells and the ECC cells, and all the bits of the second codeword are encoded in the next-to-most significant bits and in the most significant bits of both the data cells and the ECC cells.

FIG. 4 is a high-level block diagram of a flash memory device 20 of the present invention, coupled to a host 30. FIG. 4 is adapted from FIG. 1 of Ban, U.S. Pat. No. 5,404,485, which patent is incorporated by reference for all purposes as if fully set forth herein. Flash memory device 20 includes a flash memory 24, a controller 22 and a random access memory (RAM) 26. Controller 22, that corresponds to "flash control 14" of U.S. Pat. No. 5,404,485, manages flash memory 24, with the help of RAM 26, as described in U.S. Pat. No. 5,404,485. Controller 22 also encodes data, two or more bits per cell of flash memory 24, with error correction as described above.

Figure 5:
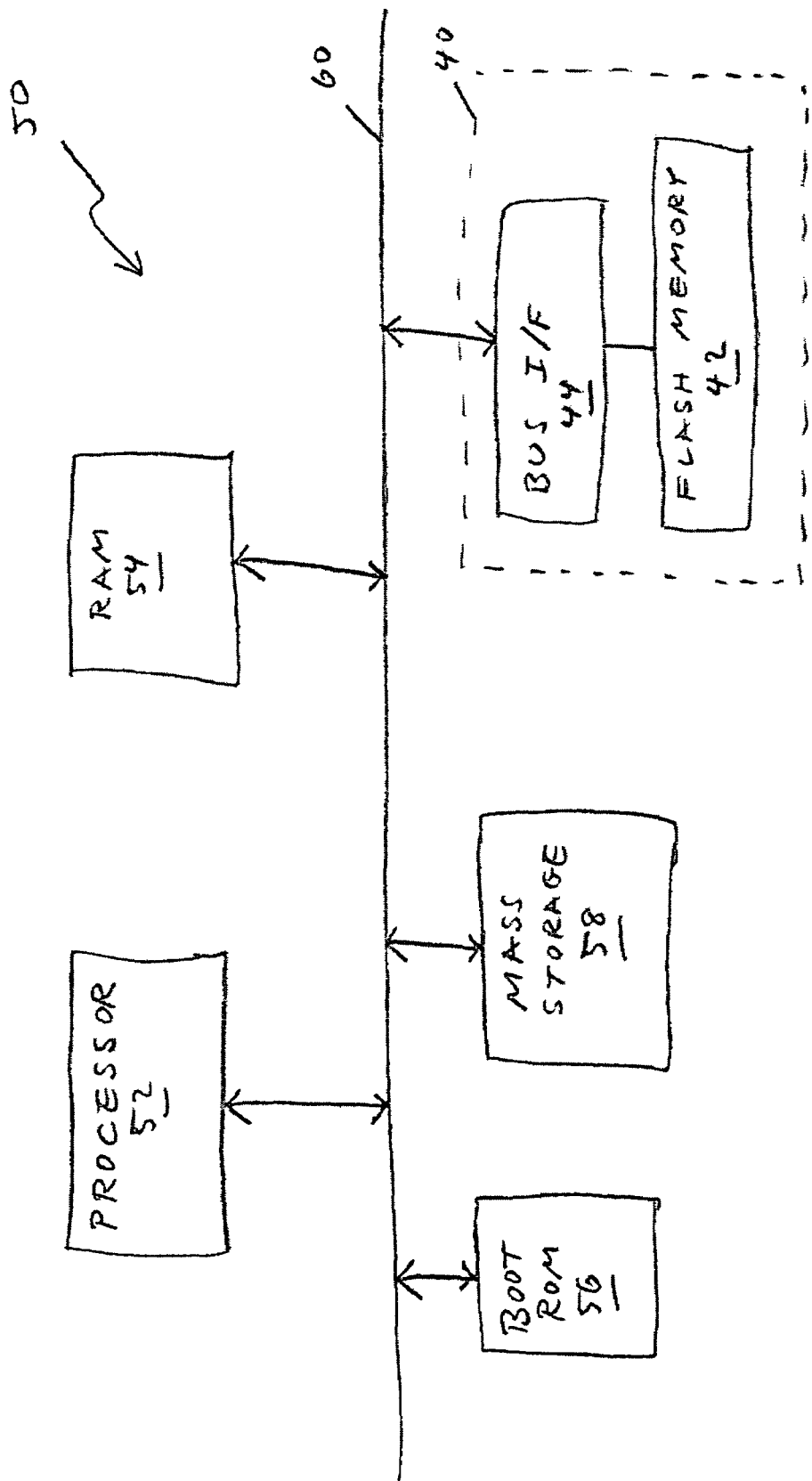
FIG. 5 is a high-level partial block diagram of a data storage system of the present invention.

FIG. 5 is a high-level partial block diagram of an alternative data storage system 50 of the present invention. Data storage system 50 includes a processor 52 and four memory devices: a RAM 54, a boot ROM 56, a mass storage device (hard disk) 58 and a flash memory device 40, all communicating via a common bus 60. Like flash memory device 20, flash memory device 40 includes a flash memory 42. Unlike flash memory device 20, flash memory device 40 lacks its own controller and RAM. Instead, processor 52 emulates controller 22 by executing a software driver that implements the methodology of U.S. Pat. No. 5,404,485 in the manner e.g. of the TrueFFS™ driver of M-Systems Flash Disk Pioneers Ltd. of Kfar Saba, Israel, and that also encodes data, two or more bits per cell of flash memory 42, as described above. Flash memory device 40 also includes a bus interface 44 to enable processor 52 to communicate with flash memory 42.

The code of the software driver that processor 52 executes to manage flash memory 42 is stored in mass storage device 58 and is transferred to RAM 54 for execution. Mass storage device 58 thus is an example of a computer-readable code storage medium in which is embedded computer readable code for managing flash memory 42 according to the principles of the present invention.

While the invention has been described with respect to a limited number of embodiments, it will be appreciated that many variations, modifications and other applications of the invention may be made.

What is claimed is:

1. A method of storing data in a Multi-Bit per Cell (MDC) flash memory, comprising the steps of:
   (a) computing a joint Error Correction Code (ECC) codeword for at least two of a plurality of logical pages of data bits; and
   (b) programming a plurality of bit pages of the MDC flash memory with at least a portion of said joint ECC codeword.

2. The method of claim 1, wherein said ECC is systematic.

3. The method of claim 1, wherein said ECC is non-systematic.

4. The method of claim 1, wherein said plurality includes more than two said logical pages, and wherein said computing is for fewer than all said logical pages.

5. The method of claim 1, wherein each cell of the MBC flash memory that is programmed with said joint ECC codeword is programmed with as many bits of said joint ECC codeword as said logical pages for which said joint ECC codeword was computed.

6. The method of claim 1, wherein each cell of said flash memory that is programmed with said joint ECC codeword is programmed with as many bits as said plurality of logical pages.

* * * * *

UNITED STATES PATENT AND TRADEMARK OFFICE
CERTIFICATE OF CORRECTION

PATENT NO. : 7,681,109 B2  
APPLICATION NO. : 11/329075  
DATED : April 12, 2010  
INVENTOR(S) : Simon Litsyn et al.

Page 1 of 1

It is certified that error appears in the above-identified patent and that said Letters Patent is hereby corrected as shown below:

Column 11, claim 1 line 9 should be corrected as follows:
change
"(MDC)"
to
"(MBC)"

line 14 should be corrected as follows:
change
"MDC"
to
"MBC"

Signed and Sealed this

Eighteenth Day of May, 2010

David J. Kappos  
*Director of the United States Patent and Trademark Office*